(12) United States Patent
An

(10) Patent No.: US 6,286,235 B1
(45) Date of Patent: Sep. 11, 2001

(54) FOOTWEAR CONTAINING AN OZONE GENERATION APPARATUS

(76) Inventor: Sun-Tae An, 401 Suksan Apt. Guseo, 1-Dong, Kumjung-Gu, Pusan, 609-311 (KR)

( * ) Notice: Subject to any disclaimer, the term of this patent is extended or adjusted under 35 U.S.C. 154(b) by 0 days.

(21) Appl. No.: 09/501,314

(22) Filed: Feb. 10, 2000

Related U.S. Application Data

(63) Continuation of application No. PCT/KR99/00640, filed on Oct. 23, 1999.

(30) Foreign Application Priority Data

Sep. 16, 1999 (KR) .................................... 99-39947

(51) Int. Cl.[7] ...................................................... A43B 5/00
(52) U.S. Cl. .................................................. 36/132; 36/136
(58) Field of Search ................................. 36/132, 136, 1

(56) References Cited

U.S. PATENT DOCUMENTS

| 3,793,561 | * | 2/1974 | Lundh | 361/260 |
| 3,947,731 | * | 3/1976 | Vainer | 361/260 |
| 4,153,852 | * | 5/1979 | Vainer | 310/339 |
| 4,748,366 | * | 5/1988 | Taylor | 310/328 |
| 4,981,651 | | 1/1991 | Horng | . |
| 5,644,858 | * | 7/1997 | Bemis | 36/137 |
| 5,945,068 | | 8/1999 | Ferone | . |
| 6,012,822 | * | 1/2000 | Robinson | 362/103 |

FOREIGN PATENT DOCUMENTS 2745476  5/1997  (EP) .
1130718  5/1989  (JP) .

* cited by examiner

Primary Examiner—Paul T. Sewell
Assistant Examiner—Troy Arnold
(74) Attorney, Agent, or Firm—Birch, Stewart, Kolasch & Birch, LLP

(57) ABSTRACT

A sanitized footwear in which an ozone generating apparatus is provided so as to suppress the propagation of bacteria, to thereby prevent and cure athlete's foot, and the footwear has at the inner part of a heel thereof a metal or a resin casing having a piezo ceramic element and a driving lever at a pin shaft of the casing. The driving lever is coupled with a driving plate, a spark electrode with electricity applied thereto is generates sparks by a piezo effect into the footwear when the piezo ceramic element is compressed by pressing power of a wearer when the wearer walks, thereby generating ozone in the footwear.

9 Claims, 2 Drawing Sheets

FOOTWEAR CONTAINING AN OZONE GENERATION APPARATUS

This application is a continuation of PCT/99/00640 filed Oct. 23, 1999.

TECHNICAL FIELD

The present invention relates to sanitized footwear in which an ozone generating apparatus is provided so as to suppress the propagation of bacteria, to thereby prevent and cure athlete's foot.

BACKGROUND ART

A conventional footwear is ill-ventilated and allows for the propagation of various kinds of bacteria, emitting a bad smell. Therefore, it is hard to prevent the bacteria, which makes athlete's foot worse.

To address the above-mentioned problem, footwear having an air pump which forcedly draws the air from outside of the footwear has been developed. However, such an air pumping system is not enough to exterminate bacteria and prevent and cure athlete's foot.

The present invention provides footwear having a piezo ceramic element which converts mechanical motion energy into electrical energy. When a person wearing the footwear of the present invention walks, an electrical discharge effect of the present invention allows for ventilation and sterilization of the footwear.

Recently, the so-called "function footwear" which is provided with various kinds of functions, for example, ventilation and suppression of bacteria, in addition to the protection of the foot, has been developed.

However, such conventional footwear only has a simple structure in that indirect functions, for example, an enhancement of cushion effect or an ventilation is achieved. That is, direct prevention against the bacteria in the footwear has not been attempted.

DISCLOSURE OF THE INVENTION

Therefore, it is an object of the present invention to provide footwear having an electrical discharge element which converts a motion energy to electrical energy using a footwearer's weight without an additional motive power, generating ozone in the footwear so as to thereby exterminate and suppress bacteria.

BEST MODE FOR CARRYING OUT THE INVENTION

Figure 1:
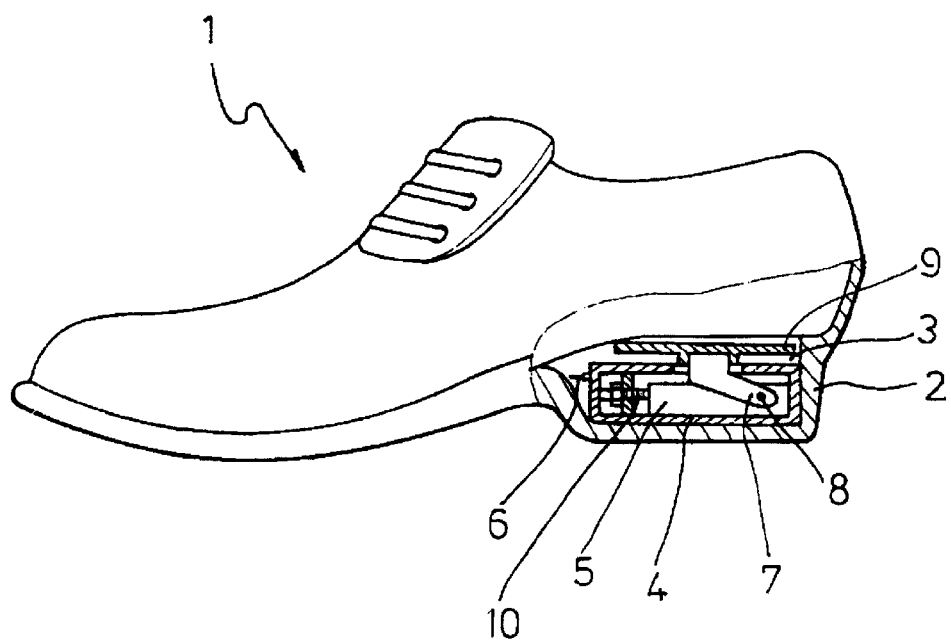
FIG. 1 is a sectional view illustrating the configuration of the present invention.
Figure 2:
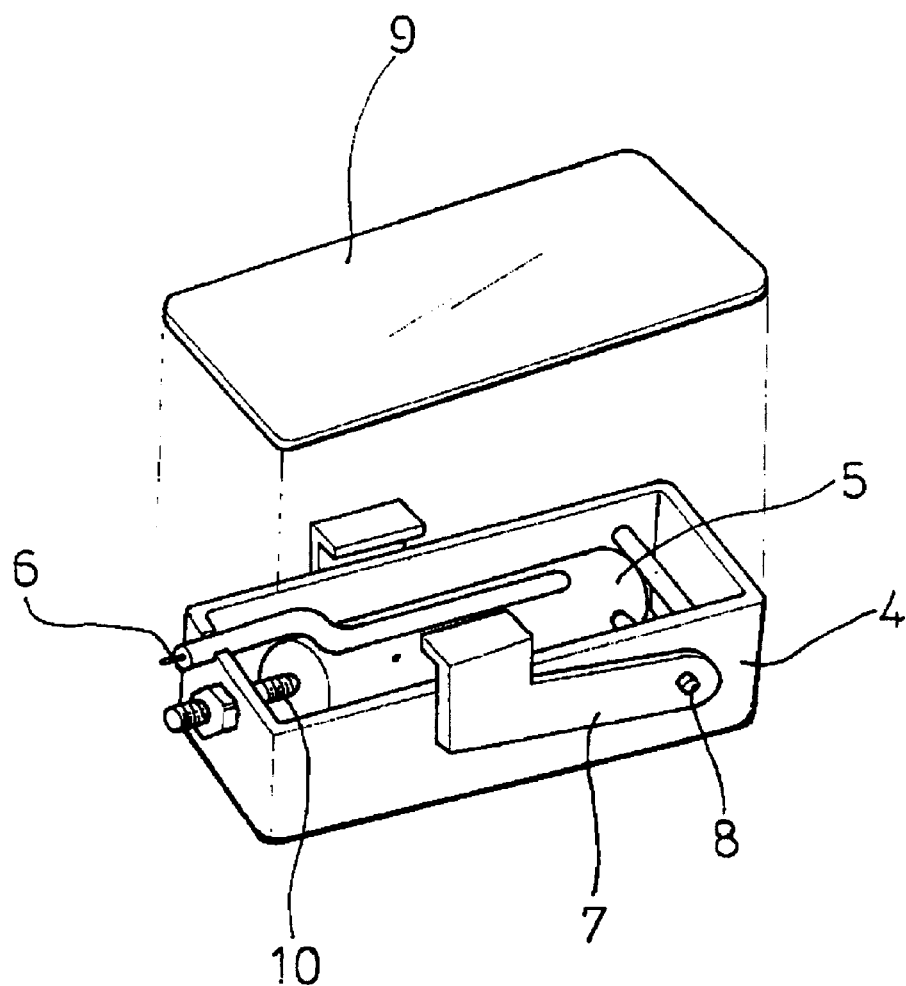
FIG. 2 is an exploded perspective view illustrating the main parts of the present invention.

FIG. 1 is a sectional view of the present invention, and FIG. 2 is an exploded perspective view of the main parts of the present invention.

An inserting element 3 is installed to a heel 2 of a footwear 1, to have an electrical discharge device.

The electrical discharge device is structured in that a driving lever 7 is bent upward, at both side surfaces of a casing 4, from a pin shaft 8, and a driving plate 9 which is to be pressed by a heel of a foot is coupled onto driving lever 7.

A piezo ceramic element 5 to be connected with pin shaft 8 is provided in casing 4.

When rotation energy is supplied to pin shaft 8 of driving lever 7, electrical energy from piezo electric effect causes, via a spark electrode 6, discharge three to five times per one operation of piezo ceramic element 5.

A small-sized product which is now available in the market may be used as piezo ceramic element 5. Piezo ceramic element 5 will be referred to as a piezo element 5, hereinafter.

Piezo element 5 is accommodated into casing 4, and is supported by pin shaft 8 and a fixing bolt 10. When driving lever 7 is lowered by a heel of a foot (when the foot touches the ground), or when driving lever 7 is released from a heel of a foot (when the foot is apart from the ground), piezo element 5 returns upward by restoring means which use spring operation of driving lever 7.

Drive motion energy of pin shaft 8 is discharged as electrical energy via spark electrode 6 and is output to the air in the footwear. Such a discharge takes place three to five times when driving plate 9 is lowered, and three to five times again when driving plate 9 is raised.

When the discharge occurs via spark electrode 6, oxygen in the air ionized and ozonized($4O_2 \rightarrow 2O_3+O_2$). The thus generated ozone circulates through the footwear, to thereby suppress and exterminate bacteria. In addition, the ozone eliminates bad smell in the footwear and significantly contributes to the prevention and curing of athlete's foot.

Accordingly, when the wearer walks with such footwear on, the bad smell will be removed and he can be protected from athlete's foot. In addition, inner portions of the footwear will always stay clean.

INDUSTRIAL APPLICABILITY

As described above, the present invention is provided with a piezo ceramic element for converting mechanical motion energy into electric energy and drives such a piezo ceramic element by a weight of a wearer's body. Thus, ozone is generated inside of the footwear, caused by a discharge effect, so as to suppress and exterminate bacteria in the footwear, to thereby prevent and cure athlete's foot.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Footwear containing an ozone generating apparatus comprising:
    a main cavity in the footwear for accommodating a foot of a wearer;
    an ozone generation chamber in fluid communication with said main cavity to facilitate circulation of air between the main cavity and said chamber; and
    an ozone generator in said chamber responsive to the weight of the wearer and walking motions of the wearer to generate ozone for circulation between the cavity and the chamber.

2. The footwear of claim 1 wherein said ozone generator includes a piezo electric element which is compressible by the walking motion of the wearer's foot to generate an electrical voltage; and spark electrodes connected to said piezo electric element for converting the electrical voltage to an electrical spark, to thereby generate the ozone.

3. The footwear of claim 2 further including an actuator for contacting a foot portion of the wearer, said actuator being movable against the piezo electric element in response to pressure from said foot, to thereby cause said piezo electric element to generate said electrical voltage during the walking motion.

4. The footwear of claim 3 wherein said ozone generator chamber is disposed in a heel portion of the footwear.

5. The footwear of claim 1 wherein said ozone generator chamber is disposed in a heel portion of the footwear.

6. The footwear of claim 2 wherein said ozone generator chamber is disposed in a heel portion of the footwear.

7. The footwear of claim 3 wherein said actuator includes a lever pivotable within said chamber.

8. The footwear of claim 7 wherein said actuator further includes a movable plate between the foot portion of the wearer and said lever, said plate moving said lever to compress or expand the piezo electric element in response to the walking motion.

9. The footwear of claim 2 wherein said spark electrodes generate multiple sparks for each step of the walking motion.

* * * * *